Oct. 28, 1924.　　　G. C. RAMSEY　　　1,513,067
DEMOUNTABLE RIM
Filed Oct. 14, 1921　　2 Sheets-Sheet 1
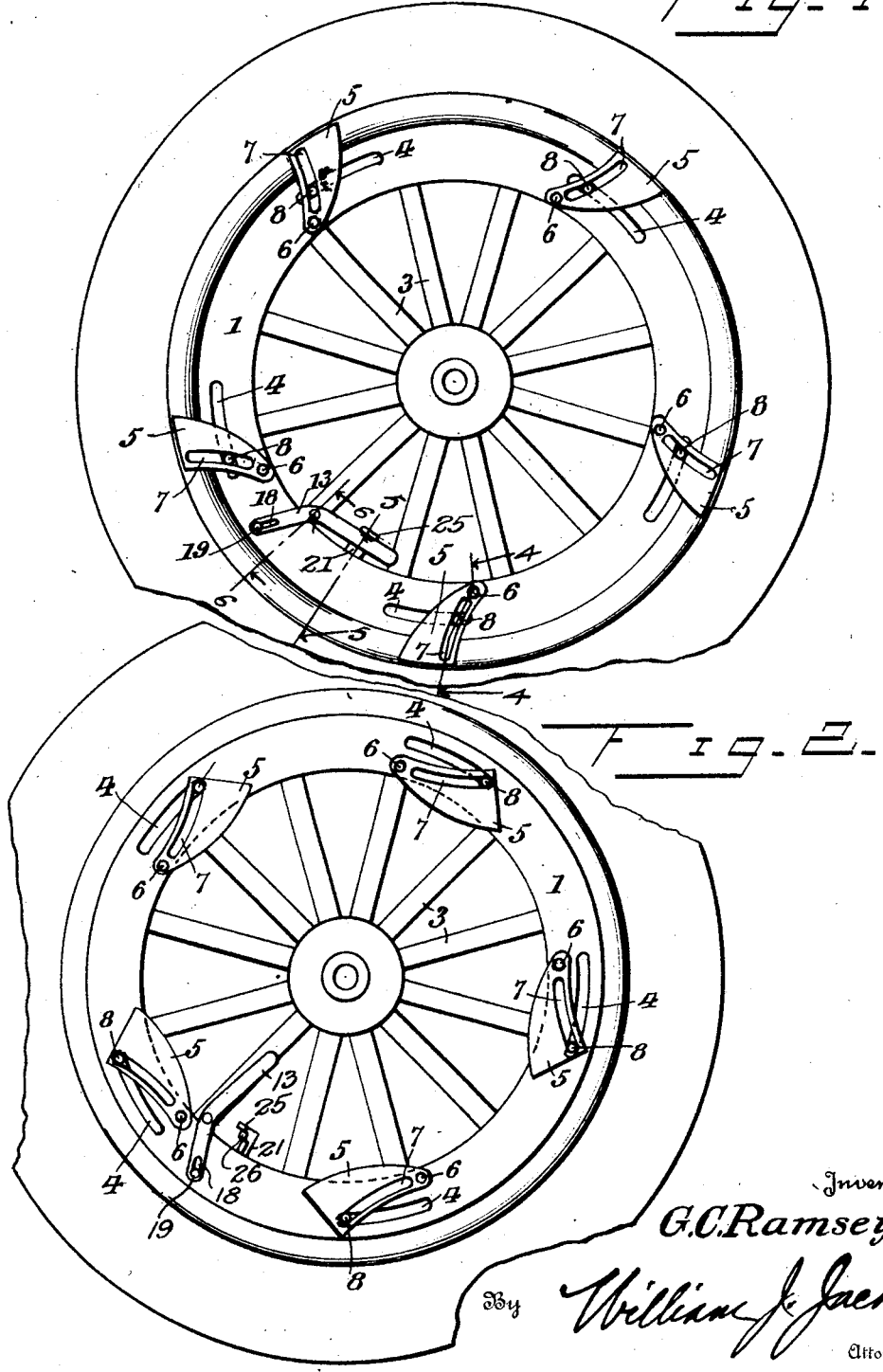
Inventor
G. C. Ramsey
By William J. Jacobi
Attorney Oct. 28, 1924.
G. C. RAMSEY
1,513,067
DEMOUNTABLE RIM
Filed Oct. 11, 1921    2 Sheets-Sheet 2
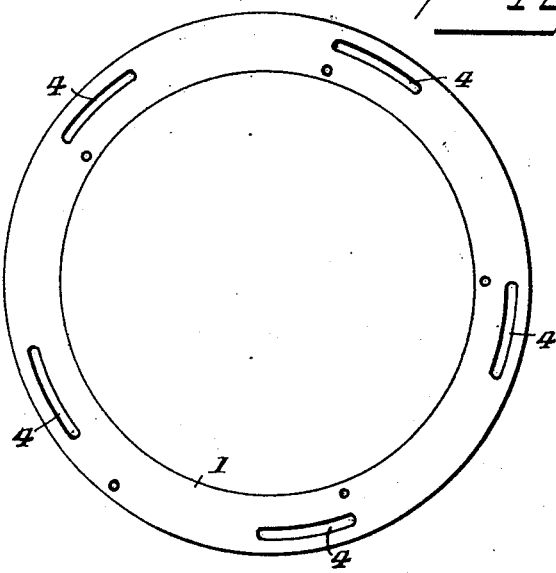
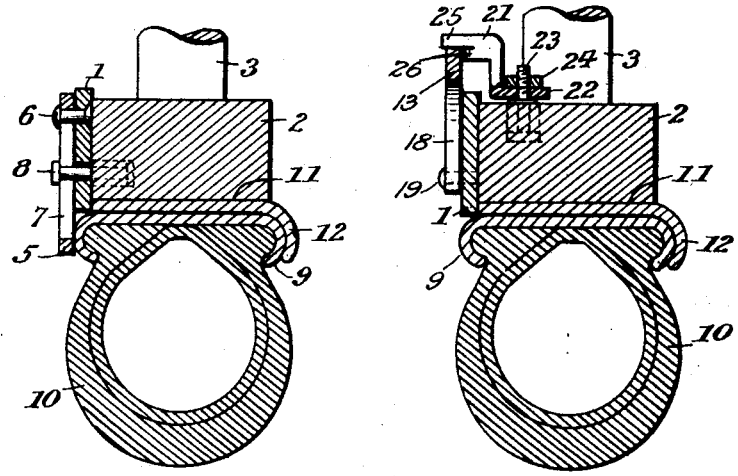
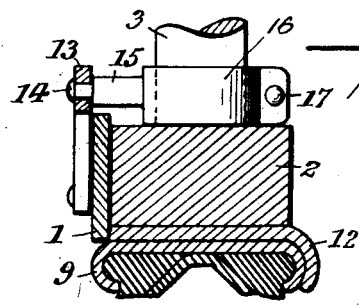
Inventor
G. C. Ramsey
By William J. Jacobi
Attorney Patented Oct. 28, 1924.

1,513,067

UNITED STATES PATENT OFFICE.

GARRIE C. RAMSEY, OF LEBANON, NEW JERSEY.

DEMOUNTABLE RIM.

Application filed October 11, 1921. Serial No. 507,108.

*To all whom it may concern:*

Be it known that GARRIE C. RAMSEY, a citizen of the United States, residing at Lebanon, in the county of Hunterdon and State of New Jersey, has invented certain new and useful Improvements in Demountable Rims, of which the following is a specification.

This invention has relation to certain new and useful improvements in a demountable rim and has for its primary object the provision of a device of this character which may be readily applied to the conventional form of wheels and used with the ordinary tires without the necessity of altering the construction thereof.

The invention has for another object the provision of a demountable rim of the character stated in which will be included a plurality of rim engaging members and means mounted on the wheel felly and adapted to be operated by a sliding member to throw the locking members outwardly over the edge of the removable rim section or tire supporting members to secure the latter in position upon the rim or felly of the wheel proper.

The invention has for a further object the provision of a demountable rim of the character stated in which all of the pivoted locking members carried by the sliding member may be operated therewith for the purpose of moving the locking members to operative and inoperative position for the purpose of holding the rim in proper place upon the felly or to permit removal of the tire and the tire rim.

The invention has for a further object the provision of a demountable rim of the character stated which will be composed of the minimum number of parts, of simple construction and operation and comparatively inexpensive as well as highly efficient in use.

With the foregoing and other objects in view as will appear as the description proceeds, the invention consists in the novel construction, combination and arrangement of cooperating elements as hereinafter set forth, claimed and shown in the accompanying drawings forming a part of the present application and in which:

Figure 1 is a side elevation of a wheel with my demountable rim applied thereto and locked in position, a portion of the wheel being broken away.

Figure 2 is a view similar to Fig. 1, showing the lock members and sliding members in inoperative position.

Figure 3 is a detail view of the sliding locking member removed.

Figure 4 is a detail cross-sectional view on the plane of line 4—4 of Fig. 1 with the parts shown on an enlarged scale.

Figure 5 is a similar view on the plane of line 5—5 of Fig. 1, looking in the direction indicated by the arrows.

Figure 6 is a detail cross-sectional view on the plane of line 6—6 of Fig. 1, looking in the direction indicated by the arrows.

Referring more to the drawings in which similar reference characters designate corresponding parts throughout the several views, 1 indicates the sliding member which is in the form of a ring adapted to be mounted upon one side of the wheel felly 2 of the conventional form of wheel 3, as shown in the drawings. The ring 1 has a plurality of spaced elongated slots 4 adjacent its outer edge and parallel with the said edge, as will be clear from the drawings. This ring 1 has a plurality of locking members 5 pivoted to the outer face of the ring 1 near the inner edge thereof by suitable pivot members 6 extended through the narrow corner portions or inner ends of said locking members 5. The locking members 5 have elongated slots 7 extending along one longitudinal edge portion thereof and slightly curved, as shown clearly in the drawings, particularly Figs. 1 and 2. The stationary guide pins 8 projecting from the side of the wheel felly 2 are so positioned that each guide pin 8 projects through one of the slots 4 of the ring 1 and the slots 7 of the locking member 5 pivoted to the ring 1 adjacent said slots 4, as shown in Figs. 1 and 2 of the drawings.

The removable rim 9 carries thereon the usual inflated tire 10 is adapted to be seated upon the solid band or iron 11 which has one side turned inwardly to provide a flange for receiving one side of the rim 9. An angular lever 13 is pivoted at its bent portion as shown in Figs. 1 and 2 of the drawing on a headed pin 14 formed at the end of a shank 15 which is carried by a collar 16. This collar 16 is adapted to fit around one of the spokes of the wheel 3 adjacent the felly 2 thereof and is held in clamped position thereon at 17 as shown in Fig. 6 of the drawings.

The shorter arm of the angular lever 13 is provided with an elongated slot 18 adjacent its forward end and slidably received therein is a pin 19 which is secured to the ring 1, the purpose of which will hereinafter be more fully described. Carried on the felly 2 of the wheel 3 and adjacent the ring 1 is mounted an angular locking member 21. This angular locking member 21 is mounted on the felly 2 by having its base 22 fitting over a threaded bolt 23 which extends upwardly from the felly 2 and is inserted therein, and a lock nut 24 is threaded upon the threaded end of the bolt 23 for holding the angular locking member 21 in proper position upon the wheel felly 2. The upper forward end 25 of the angular locking member 21 is cut away to form a seat or pocket 26 for engagement with the free end of the angular lever 13 when the same is in position as shown in Fig. 1 of the drawings.

In use after a rim and inflated tire carried thereby is placed upon the felly band 11 of the wheel, the slidable ring 1 and the locking members 5 pivotally mounted thereon are in position as shown in Fig. 2 of the drawings, the sliding ring 1 and the locking fingers 5 pivotally mounted thereon are caused to move in the manner as shown in Fig. 1 of the drawings whereby they are now in a locked position. This is accomplished by pulling downwardly on the handle of the angular lever 13 whereby the slot 18 formed in the short arm of the same will cause the pin 19 carried by the ring 1 to move in a clockwise direction and as the ring 1 moves in such a direction and slides on the side faces of the wheel felly 2, the stationary guide pins 8 carried by the felly 2 and extending through the registering slots 4 and 7 formed in the sliding ring 1 and locking members 5 respectively will cause the locking members 5 to move outwardly and engage the rim 9 of the opposite side as is accomplished by the flange 12 formed upon the felly band 11 on the opposite side. The rim 9 and tire 10 will thereby be caused to be securely held upon the felly of the wheel and to further assure the rim 9 of being held in a locked position the free end of the angular lever 13 is caused to be held in engagement with the underside of the forward upward end 25 of the angular locking member 21 thereby preventing the accidental movement of the locking fingers or members 5 from engagement with the rim 9.

To release or remove the rim and tire carried thereby from a locked position upon the wheel felly, the lever 13 is released from the locking member 21 and is moved in a reverse direction whereby the ring 1 will move in a counterclockwise direction and will cause the locking members 5 to move inwardly therewith so as to release the locking members 5 from engagement with the rim 9.

It is believed that the complete construction and operation of this invention may now be readily understood without further detailed description. Attention may be directed to the fact, however, that while the preferred embodiment of the invention has been shown and described, it is to be understood that I do not wish to be limited thereto and that minor changes may be made in the construction and arrangement of parts within the scope of what is claimed without departing from the spirit of the invention.

What I claim is:

1. A demountable rim securing means comprising the combination with a wheel felly and a rim member removably mounted thereon, of a ring slidably mounted upon the side face of the said felly, locking members pivotally mounted at one end to the said ring, said ring and locking members provided with registering slots, means carried by the said felly and extending through the registering slots in said ring and locking members for causing the operation of the locking members.

2. A demountable rim securing means comprising the combination with a wheel felly and a rim member demountably positioned thereon, of a ring carried on one side of the felly and adapted for limited sliding movement in either direction thereon, locking members pivotally mounted on the said ring, said ring and locking members provided with registering slots, stationary pins carried by said felly and extending through the registering slots formed in the said ring and locking members for causing the said locking members to move into operative or inoperative position, and means associated with the sliding ring for holding the same and the locking ring in a locked position.

3. A demountable rim securing means comprising the combination with a wheel felly and a rim member removably mounted thereon, of a slidable ring carried on the side face of the said felly, locking members pivotally mounted at one end to the said slidable ring, said slidable ring and locking members pivotally mounted thereon provided with registering slots, stationary pins carried by the side of the felly and extending through the registering slots in the ring and locking members to cause the inward and outward movement of the said locking members upon the slidable ring, a lever pivoted at one end to the said slidable ring for moving the same and the locking members carried thereby into operative and inoperative position, and means on the felly for holding the lever and the slidable ring and locking members in a locked position.

In testimony whereof I affix my signature.

GARRIE C. RAMSEY.